3,328,414
2-PYRIDINE-ALDEHYDE-GUANYL-HYDRAZONES
Karl Muth, Kelkheim, Taunus, Alfred Bänder, Eppenhain, Taunus, and Heinrich Ruschig, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Sept. 1, 1964, Ser. No. 393,733
Claims priority, application Germany, Sept. 7, 1963,
F 40,706
3 Claims. (Cl. 260—296)

It is known that pyridyl-alkyl-ketones react with amino-guanidine or its salts, thus forming the corresponding guanyl-hydrazones. These substances are active against allergies and inflammations.

Furthermore, the guanyl-hydrazones of 3- and 4-pyridine-aldehyde have been prepared, but have not been pharmacologically tested.

A substance similar to amino-guanidine, i.e. the tri-amino-guanidine, has been reacted with 2-pyridine-aldehyde to form a tricondensation product, which is supposed to show hypotensive properties.

The reaction product of 2-pyridine-aldehyde with amino-guanidine has been hitherto not yet described.

Now we have found that compounds corresponding to the formula

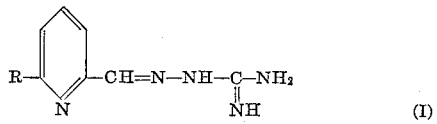

wherein R represents hydrogen or the methyl group show an excellent hypotensive action.

The present invention relates to said compounds and their physiologically tolerated salts as well as to a process for their manufacture. The present invention likewise comprises pharmaceutical preparations of said compounds with pharmaceutically suitable carrier substances.

The compounds are obtained by reacting a compound corresponding to the formula

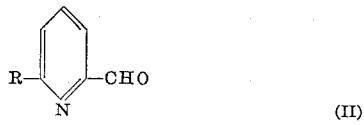

wherein R has the meaning given above, with amino-guanidine or a salt of the amino-guanidine compound.

As salts there are particularly used the hydrochloride, the bicarbonate or the nitrate of amino-guanidine.

The aldehydes corresponding to the Formula II can be condensed with amino-guanidine or its salts in a weakly acid to alkaline medium at a temperature between room temperature and 100° C.

If desired, this condensation can take place in the presence of a solvent such as water or a lower alcohol or a mixture thereof.

Instead of the aldehydes of the general Formula II, compounds from which said aldehydes are formed may be used as starting substances. In these cases the newly formed aldehyde without being first isolated is converted in its reaction mixture by adding the amino-guanidine compound into the products of the general Formula I. The 2-cyano-pyridine, for instance, can be subjected to the Stephen reaction.

In this reaction, the 2-cyano-pyridine is converted into the aldimine complex with the aid of stannic chloride and hydrochloric acid in anhydrous solvents. Adding aqueous amino-guanidine solution to the aldimine complex causes it to hydrolise and give 2-pyridine-aldehyde which immediately reacts to form the corresponding guanyl-hydrazone, which is obtained in good yields.

If desired, the compounds obtained can be converted with physiologically tolerable acids into their acid addition salts. As organic acids, acetic acid, malic acid, succinic acid, lactic acid, maleic acid, fumaric acid, sorbic acid, citric acid, aceturic acid, aspartic acid, p-amino-benzoic acid or salicylic acid may be used. As mineral acids, hydrohalic acids, for instance, hydrochloric or hydrobromic acid, furthermore sulfuric acid, phosphoric acid or carbonic acid may be used.

When intravenously applied in very small doses, the new 2-pyridine-aldehyde-guanyl-hydrazones show an excellent hypotensive action which action is within the scope of that of the acetyl-choline. As may be seen from the following comparison, it is surprising that the 2-guanyl-hydrazones of the present invention are considerably superior to the 3- and 4-pyridine-aldehyde-guanyl-hydrazones as well as superior to other known preparation showing hypotensive action.

In order to determine the activity of various pyridine aldehyde-guanyl-hydrazones in comparison with other known hypotensive substances, tests were carrier out in rabbits under urethane narcosis. The blood pressure was measured by means of a mercury manometer, and the values were plotted against time by means of a kymograph. The results from these examinations show that a dose of 100 micrograms of 3-pyridine-aldehyde-guanyl-hydrazone, intravenously adminstered, lowers the blood pressure for 1 minute by 40 mm. In contradistinction thereto the 2-pyridine-aldehyde-guanyl-hydrazone causes a lowering of the blood pressure to approximately the same extent and for approximately the same duration by administering a dose of merely 1 microgram. In the same manner, two micrograms of 6-methyl-2-pyridine aldehyde-guanyl-hydrazone lower the blood pressure for 2 minutes by 36 mm.

With 500 milligrams of 4-pyridine-aldehyde-guanyl-hydrazone a hypotension amounting to 56 mm. was attained for a duration of 6 minutes. About the same effect is already demonstrated by administering 10 micrograms of 2-pyridine-aldehyde-guanyl-hydrazone.

On applying the known tripyridylene-triamino-guanidine, a condensation product of 2-pyridine-aldehyde and triamino-guanidine, a nearly comparable effect is obtained only with more than 1000 times the dose. Below a threshold dose of 1 milligram, no hypotension at all was observed and only when applying 1 milligram the blood pressure was reduced for 8 minutes by 20 mm. Moreover, with increasing dose the effect of tripyridylene-triamino-guanidine decreases. 25 milligrams cause only a hypotension of 30 millimeters for 1 minute and 100 milligrams even cause a raising of the blood pressure by 20 mm. for 90 seconds.

Since in practice preparations showing a hypotensive action are administered in most cases orally, diagrams were plotted under the above-mentioned conditions showing the blood pressure in rabbits to which the 2-pyridine-aldehyde-guanyl-hydrazones had been given orally and in comparison diagrams were plotted of heptamethylene-imino-ethyl guanidine, a known medicament showing a hypotensive action. These tests revealed a distinct superiority of the 2-pyridine-aldehyde-guanyl-hydrazone as the use of one fourth of the dose of that of hepta-methylene-imino-ethyl-guanidine already caused a deeper and more rapidly occurring hypotension. Doses of 25 and 50 milligrams of the last mentioned compound showed no effect, but a dose of 25 milligrams of 2-pyridine-aldehyde-guanyl-hydrazone attained a reduction of the blood pressure by 20 mm. within 35 minutes, which after 1 hour still was 10 mm. 50 milligrams of 2-pyridine-aldehydeguanyl-hydrazone lowered the blood pressure by 44 mm. for 2 and a half hours.

The products of the invention are suitable for producing orally or parenterally administerable preparations showing a hypotensive effect useful in the treatment of hypertonia. They may be used as such or in the form of their salts with physiologically tolerated acids. As medicinal preparations, tablets are preferentially considered. These contain in addition to the products of the invention the usual auxiliaries and carrier substances such as talc, starch, lactose, tragacanth or magnesium stearate.

Corresponding injection solutions contain, for example, the easily soluble hydrochloride of a product according to the invention dissolved in water or a physiological NaCl-solution. For the therapy of hypertonia the products of the invention are administered in doses of 10 to 100 milligrams.

The following examples illustrate the invention:

EXAMPLE 1

*2-pyridine-aldehyde-guanyl-hydrazone-dichlorohydrate*

A suspension is formed from 15.9 grams of amino-guanidine-bicarbonate in 75 milliliters of water and in order to form the chlorohydrate an equimolar amount of concentrated hydrochloric acid is added. 10.7 grams of 2-pyridine-aldehyde are added to the suspension and the pH-value is adjusted to 9–10 by dropwise adding dilute sodium hydroxide solution. After a short heating on the steam bath the whole is cooled to room temperature and carbon dioxide is introduced until no further precipitate is formed. The precipitate is filtered off, dissolved in an amount as small as possible of alcholic hydrochloric acid and the dichlorohydrate of 2-pyridine-aldehyde-guanyl-hydrazone that has formed is precipitated by means of ether. By recrystallization from a small amount of alcohol a product of a melting point of 232–234° C. (decomposition) is obtained.

EXAMPLE 2

*2-pyridine-aldehyde-guanyl-hydrazone-dichlorohydrate*

10 grams of 2-cyano-pyridine are dissolved in 200 milliliters of diethylene-glycol-diethyl ether and to this solution 70 grams of anhydrous tin chloride are added. Dry hydrogen chloride gas is introduced into this mixture until a clear solution has formed. It is held over night and a boiling aqueous solution of 30 grams of amino-guanidine bicarbonate in 250 milliliters of water is then added. On cooling, the tin chloride complex of the 2-pyridine-aldehyde-guanyl - hydrazone - dichlorohydrate precipitates. It is filtered off with suction and dried.

10 grams of the dry raw complex are dissolved with heating, in 100 milliliters of water and hydrogen sulfide in introduced into the solution. The precipitated tin sulfide is filtered off and the filtrate is concentrated to an amount of 10 milliliters. 200 milliliters of ethanol are added and the mass is concentrated again to about 15 milliliters. Upon cooling of the concentrate, 4 grams of 2-pyridine-aldehyde-guanyl-hydrazone-dichlorohydrate are obtained. By recrystallization from ethanol a product is obtained which decomposes at 232–234° C.

EXAMPLE 3

*6-methyl-2-pyridine-aldehyde-guanyl-hydrazone-dichlorohydrate*

22.4 grams of amino-guanidine-bicarbonate in 200 milliliters of water are converted into the nitrate by means of 42 milliliters of 4N-nitric acid. At room temperature, 20 grams of 6-methyl-2-pyridine-aldehyde are added with stirring to the weakly acid solution. After 2 hours a precipitate is formed which is filtered off with suction and dried under reduced pressure at 50° C. This precipitate is the 6 - methyl - 2 - pyridine-aldehyde-guanyl-hydrazone-mononitrate which, after having been recyrstallized from a mixture of ethanol and benzene melts at 202° C. with decomposition.

The 6-methyl-2-pyridine-aldehyde-guanyl-hydrazone-dichloro-hydrate obtained from the mononitrate by reaction with concentrated hydrochloric acid melts at 248–251° C. with decomposition.

We claim:

1. A compound selected from the group consisting of (1) pyridine-aldehyde-guanyl-hydrazones of the formula

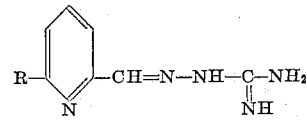

wherein R is a member selected from the group consisting of hydrogen and methyl and (2) physiologically tolerable acid addition salts thereof.

2. 2-pyridine-aldehyde-guanyl-hydrazone - dihydrochloride.

3. 6-methyl - 2 - pyridine-aldehyde-guanyl-hydrazone-dihydrochloride.

References Cited

UNITED STATES PATENTS

| | | | |
|---|---|---|---|
| 2,978,456 | 4/1961 | Birtwell et al. | 260—296 |
| 2,986,573 | 5/1961 | Topliss et al. | 167—65 |
| 3,178,348 | 4/1965 | Bickerton | 167—65 |
| 3,217,012 | 11/1965 | Backman et al. | 260—296 |

OTHER REFERENCES

Chem. Zent, pp. 579–80 (1955), Abstracting Micovic et al., Ber. Chem. Ges. Belgrad, vol. 18, pp. 105–13 (1953).

Chem. Zent, No. 1 p. 897 (1964), Abstracting Skrowaczewska et al., in Bull. Acad. Polon Sci., Ser. Sci. Chim., vol. 9, pp. 213–15 (1961).

WALTER A. MODANCE, *Primary Examiner.*

JOHN D. RANDOLPH, *Examiner.*

ROBERT T. BOND, *Assistant Examiner.*